Figure 4:
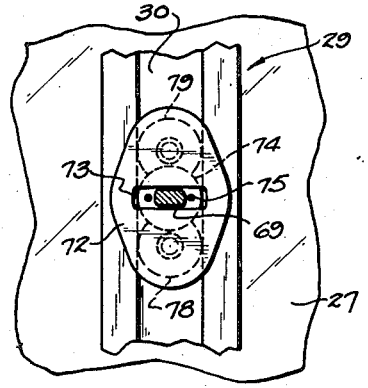

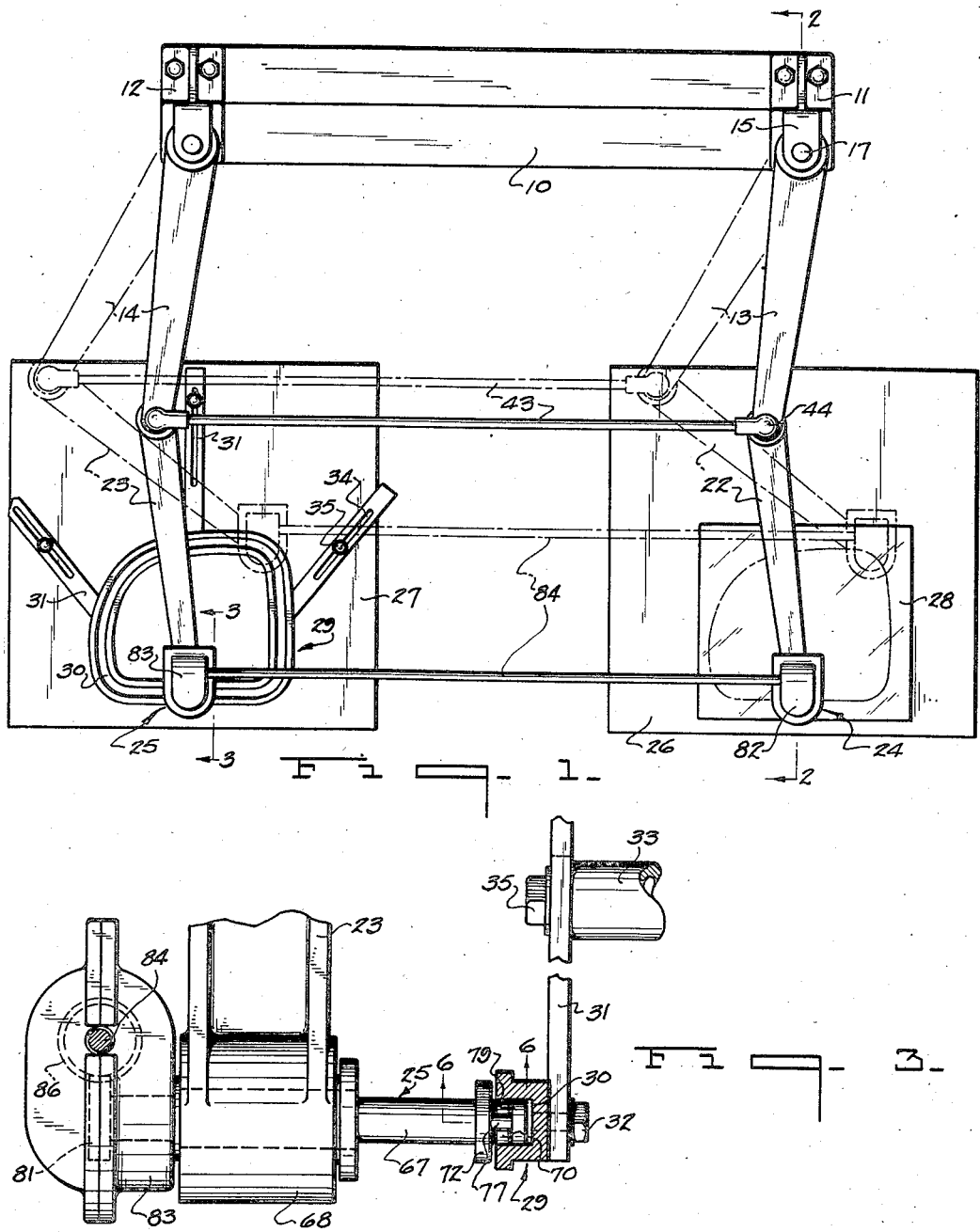

March 31, 1936.        D. H. GOODWILLIE        2,035,544
CUTTING MACHINE
Filed Nov. 8, 1934        3 Sheets-Sheet 2
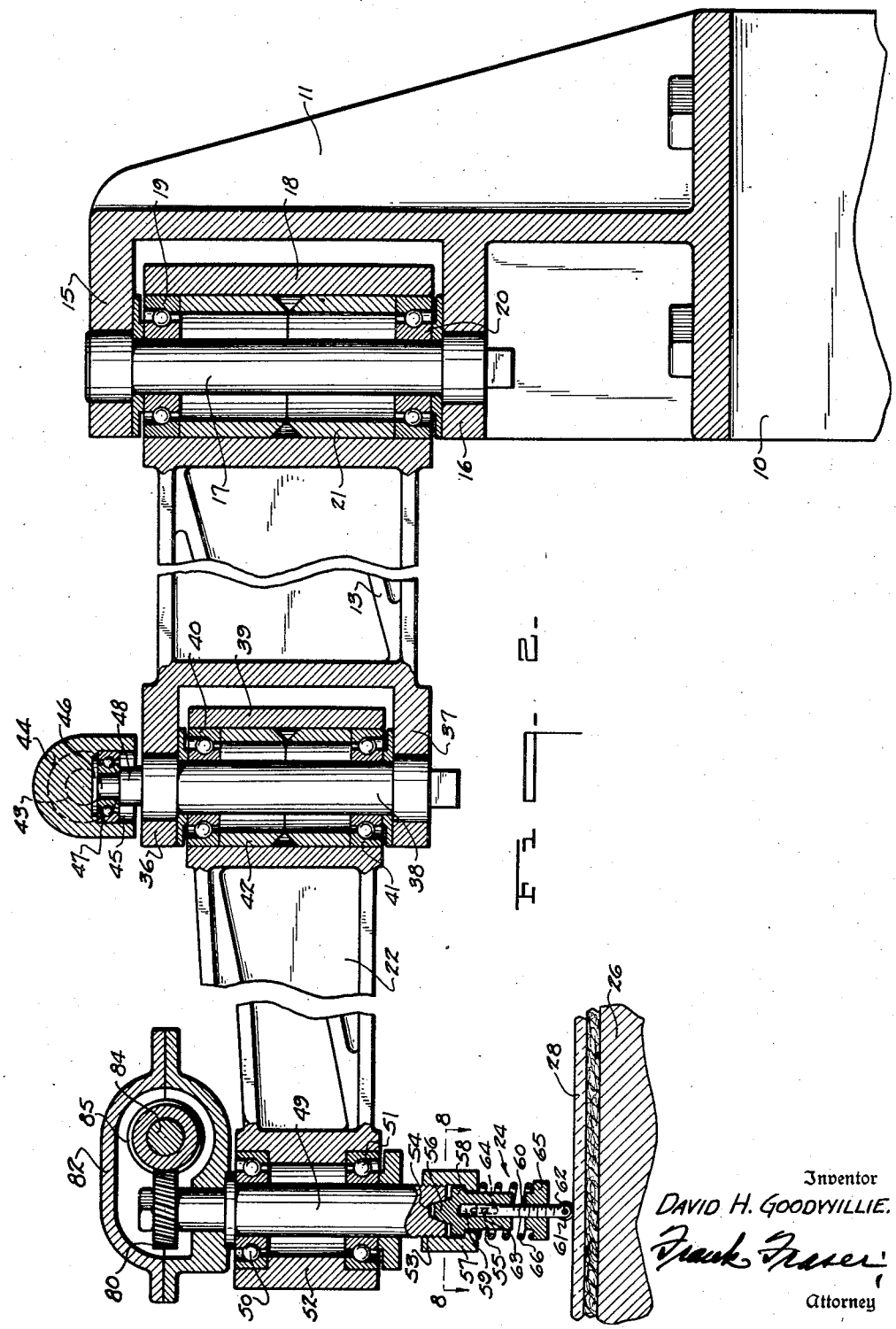
Inventor
DAVID H. GOODWILLIE.
Frank Fraser
Attorney March 31, 1936.　　　D. H. GOODWILLIE　　　2,035,544

CUTTING MACHINE

Filed Nov. 8, 1934　　　3 Sheets-Sheet 3

Inventor
DAVID H. GOODWILLIE.
By Frank Fraser
Attorney

Patented Mar. 31, 1936

2,035,544

UNITED STATES PATENT OFFICE 2,035,544

CUTTING MACHINE

David H. Goodwillie, Toledo, Ohio, assignor to Libbey-Owens-Ford Glass Company, Toledo, Ohio, a corporation of Ohio Application November 8, 1934, Serial No. 752,089

8 Claims. (Cl. 33—25)

The present invention relates to improvements in cutting machines generally and more particularly to a machine designed primarily for the cutting of glass sheets or plates, although it is of course not restricted to such use.

At the present time, it is the usual practice, in the cutting out of forms or sections of circular, elliptical, or irregular outline from sheets or plates of glass, to employ a template member or pattern plate of the desired shape and size which is first laid upon the glass sheet to be cut, after which the cutting or scoring tool is drawn over and in contact with the glass, being held in engagement with the outer edge of the template or pattern and guided thereby. After the glass has been scored, the template or pattern is removed and the glass broken along the score lines. The cutting or scoring tool commonly employed is of the hand operated variety equipped with either a diamond or a rotatable steel cutting wheel.

The hand method of cutting above described is, however, open to several objections, among which may be mentioned the fact that the template must usually be held upon the glass to be cut with one hand, while the operator draws the scoring tool over the glass with the other hand. When so manipulated, the template sometimes slips or becomes misplaced and the work is spoiled. Also, a uniform cutting pressure on the scoring tool is difficult to maintain throughout its path of travel when moved by hand, with the result that the score is deeper at some places than at others, so that in separating the waste from the cut section, a rough break occurs, leaving the edges of the cut-out section more or less ragged.

It is the aim of this invention to provide a machine for cutting glass sheets or plates which will effectively overcome all of those objectionable features referred to hereinabove as being present in the hand method of cutting and which can also be successfully operated by relatively unskilled workmen.

Another important object of the invention is to provide a cutting machine for cutting out from glass sheets or plates forms or sections of circular, elliptical, or irregular outline rapidly, accurately, and economically.

Another object of the invention is the provision of a cutting machine of the above character embodying a template or guide member of a predetermined shape and size, together with tracer means associated therewith and operatively connected with the cutting tool in such a manner that the said tool, moving in unison with the tracer means, will cut a faithful and accurate reproduction of the template or guide member contour.

A further object of the invention is the provision of a cutting machine of the above character wherein the tracer means and cutting tool are operatively connected together in such a manner that the cutting edge of the cutting tool will always be maintained in a line tangent to that of the cut whereby the shape of the template will be accurately transferred to the cut sheet.

Other objects and advantages of the invention will become apparent during the course of the following description when taken in connection with the accompanying drawings.

Figure 5:
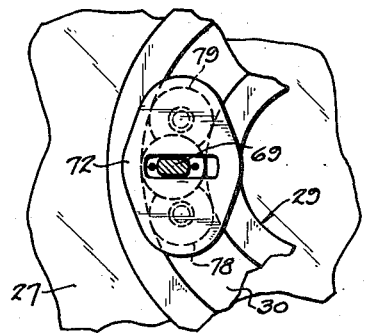
Figure 6:
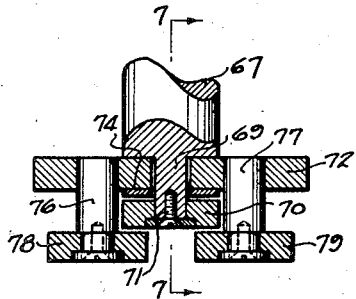
Figure 8:
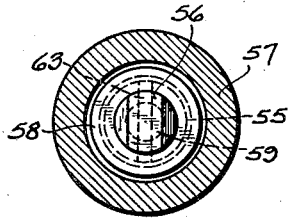
Figure 7:
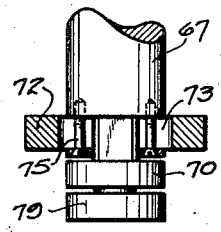

In the drawings wherein like numerals are employed to designate like parts throughout the same, Fig. 1 is a plan view of a cutting machine constructed in accordance with the present invention, Fig. 2 is a sectional view taken substantially on line 2—2 of Fig. 1, Fig. 3 is a section taken substantially on line 3—3 of Fig. 1, Fig. 4 is a plan view of the tracer means showing the position of the guide rollers when traveling in a straight path, Fig. 5 is a similar view showing the position of the guide rollers when moving through a curved path, Fig. 6 is a detail section of the tracer means taken substantially on line 6—6 of Fig. 3, Fig. 7 is a section taken substantially on line 7—7 of Fig. 6, and Fig. 8 is a detail section of the cutting unit taken substantially on line 8—8 of Fig. 2.

In the embodiment illustrated in the drawings, the cutting machine provided by the present invention includes a horizontal elongated base member 10 having mounted thereupon, adjacent the opposite ends thereof, supporting brackets 11 and 12 on which are mounted the inner pantograph arms 13 and 14 respectively. As best shown in Fig. 2, each bracket 11 and 12 is formed with vertically spaced horizontal ears 15 and 16 which carry a vertical pin 17 to which the respective pantograph arm is pivotally connected, the inner end of said arm being formed with a bearing 18 through which the said pin 17 is received. Arranged within the bearing 18, adjacent its upper and lower ends, are the ball bearing assemblies 19 and 20 respectively which greatly facilitate the swinging movement of the pantograph arm, while disposed between the ball bearing assemblies is a two-part bushing 21 provided to maintain the ball bearing assemblies in place.

Hinged to the outer ends of the inner pantograph arms 13 and 14 are the outer pantograph arms 22 and 23 respectively. Carried at the outer end of the arm 22 is the cutting unit designated in its entirety by the numeral 24, while carried at the outer end of arm 23 is the tracer means designated generally by the numeral 25.

The numerals 26 and 27 designate the cutting table and tracer table respectively, the glass sheet 28 to be cut being laid upon table 26, while carried by table 27 is the template or guide member 29 having the same contour as the section of glass it is desired to cut from the glass sheet 28. The template 29 is here shown as being in the form of a channel member (Figs. 1 and 3) provided with a guide-groove or way 30, although it may consist of two spaced portions suitably connected together to provide a guide-groove or way therebetween. The template is carried by a plurality of supporting strips 31 secured to the template by screws or the like 32 (Fig. 3) and carried by posts 33, said strips being provided with slots 34 within which operate screws 35 carried by said posts and which facilitate the proper positioning of the template.

Each of the inner pantograph arms 13 and 14 is formed at its outer end with vertically spaced ears 36 and 37 carrying a pin 38 upon which the respective outer pantograph arm is mounted in the same manner that the inner arms are mounted upon pins 17. Thus, the inner end of each outer pantograph arm 22 and 23 is provided with a bearing 39 positioned between the ears 36 and 37 and through which the pin 38 is received, said bearing containing at its upper and lower ends the ball bearing assemblies 40 and 41 respectively between which is arranged the two-part bushing 42.

The pins 38 project upwardly through the ears 36 and are connected together by a transverse rod 43, said rod being formed at each end with a head 44 which fits over the upper end of the respective pin. Each head 44 is provided with a recess 45 (Fig. 2) within which the upper end of the respective pin 38 is received, said pin being formed at its upper end with an annular flange 46 beneath which is disposed the ball bearings 47 supported upon the upper end of the reduced portion 48 of the said pin. This construction is provided to permit free relative movement between the pins 38 and rod 43 upon swinging of the pantograph arms.

The cutting unit 24 includes a vertical shaft 49 journaled in the ball bearing assemblies 50 and 51 which are mounted within the bearing 52 formed at the outer end of pantograph arm 22. The shaft 49 projects downwardly beyond the bearing 52 and is externally threaded as at 53, said shaft being also provided with a recess 54 in its lower end. The numeral 55 designates a cylindrical cutter support formed at its upper end with a tapered head 56 which is received within the recess 54 whereby to prevent turning of the said cutter support relative to the shaft 49. The cutter support is held in place by a collar 57 threaded upon the lower end of shaft 49 and engaging an annular flange 58 formed on the cutter support.

The cutter support is also provided with a vertical elongated recess 59 within which is slidably received the cutter holder 60 carrying at its lower end the freely rotatable steel cutting wheel 61 mounted on a horizontal pin 62. The cutter holder is permitted a limited amount of vertical sliding movement within the cutter support by means of a transverse pin 63 carried by said holder and operating through vertical slots 64 in said support. Threaded upon the cutter holder, adjacent its lower end, is a nut 65 and interposed between the said nut 65 and collar 57 is a compression spring 66 which acts to yieldably maintain the cutting wheel 61 in engagement with the glass.

The tracer means 25 includes a vertical shaft 67 rotatably mounted in the bearing 68 formed at the outer end of pantograph arm 23. The shaft 67 is provided at its lower end with a reduced flattened portion 69 and carried by this flattened portion is a freely rotatable guide roller 70 secured thereto by a screw or the like 71. Loosely received upon the flattened portion 69 of shaft 67 is a supporting plate 72 having a slot 73 therein through which the said flattened portion of the shaft extends, said supporting plate being held upon the shaft by a disc 74 secured to said shaft by screws or the like 75. Carried adjacent the opposite ends of the supporting plate 72 are the vertical spindles 76 and 77 upon which are mounted the freely rotatable guide rollers 78 and 79 respectively.

The guide rollers 70, 78 and 79 are adapted to be received within the guide-groove or way 30 of the template 29 and when traveling in a straight path are maintained in alignment with one another as shown in Fig. 4. However, it will be noted that the slot 73 in supporting plate 72 is considerably longer than the width of the flattened portion 69 of the shaft 67 and this arrangement is provided in order that the supporting plate 72 and rollers 78 and 79 carried thereby may be permitted to move transversely relative to the shaft 67 when the said rollers are caused to travel in a curved path as in Fig. 5. The guide rollers 70, 78 and 79 are adapted to fit snugly within the guide-groove or way 30 of the template so that they engage the opposite side faces thereof at all times.

As pointed out above, the movement of the tracer means is adapted to be imparted to the cutting tool in such a manner that the cutting tool will reproduce and cut out a form or section of glass of the same shape and size as the said template. In order that this may be achieved, it is of course essential that the cutting wheel 62 be always maintained in a line tangent to that of the cut, especially when there is a sudden change in the contour of the template. To this end, the present invention also embodies the provision of means for causing the movements of the tracer means to be accurately transmitted to the cutting wheel. In the embodiment illustrated, the vertical shafts 49 and 67 project upwardly beyond the outer pantograph arms 22 and 23 respectively and have keyed to their upper ends beveled gears 80 and 81 which are enclosed in the respective gear cases or housings 82 and 83 suitably supported upon the bearings 52 and 68. Extending between and rotatably supported within said housings is a horizontal shaft 84 carrying at its opposite ends gears 85 and 86 which mesh with the gears 80 and 81 respectively. With this arrangement, it will be seen that upon turning of the tracer shaft 67, exactly the same movement will be transmitted to the cutter shaft 49 through the intermeshing gears 80—85 and 81—86.

In operation, the glass sheet 28 to be cut is laid upon the top of work table 26 and a template 29 of the desired shape and size mounted upon the tracing table 27. After the glass sheet and template have been properly positioned, the operator moves the tracer means around the template and this movement will be imparted to the cutting unit through the pantograph arrangement of the arms 13—14 and 22—23, thereby causing the cutting wheel to cut a faithful reproduction of the template upon the glass. Moreover, any movement of the tracer means will be accurately imparted to the cutting wheel. Thus, upon movement of the guide rollers 78—79 through a curved path, the shaft 67 will be rotated about its axis and exactly the same degree of rotation will be transmitted to the cutting unit as explained above. This results in the cutting wheel being always maintained in a line tangent to the line of cut and permits relatively sharp or small radius curves to be executed as readily as large radius curves. With the machine herein provided, sections of circular, elliptical, or irregular outline can be rapidly, accurately, and economically cut out from the glass sheets or plates. Furthermore, since the accuracy of the cut is not dependent upon the skill of the operator, the machine can be successfully operated by relatively unskilled workmen.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In cutting apparatus of the character described, a base, a pair of spaced horizontal arms pivotally mounted upon said base, a second pair of arms hinged respectively to the outer ends of said first pair of arms, a cutting unit rotatably carried by one of said second-named arms and including a cutting tool, a template member, tracer means rotatably carried by the other of said second-mentioned arms and continuously engaging said template-member at two horizontally spaced points, means for connecting said arms together in a manner that the tracer means and cutting unit move in unison, and means connecting said tracer means and cutting unit for transmitting rotary movement of the former to the latter.

2. In cutting apparatus of the character described, a base, a pair of spaced horizontal arms pivotally mounted upon said base, a second pair of arms hinged respectively to the outer ends of said first pair of arms, a cutting unit rotatably carried by one of said second-named arms and including a cutting tool, tracer means rotatably carried by the other of said second-mentioned arms and including a pair of horizontally spaced guide rollers, a template member having a guide-groove therein within which said guide rollers are received, means for connecting said arms together in a manner that the tracer means and cutting unit move in unison, and means connecting said tracer means and cutting unit for transmitting rotary movement of the former to the latter.

3. In cutting apparatus of the character described, a base, a pair of spaced horizontal arms pivotally mounted upon said base, a second pair of arms hinged respectively to the outer ends of said first pair of arms, a vertical shaft rotatably carried at the outer end of one of said second-named arms, a cutting tool carried by said shaft, a template member, a second vertical shaft rotatably carried at the outer end of the other of said second-mentioned arms, tracer means carried by said second shaft and continuously engaging said template member at two horizontally spaced points located at opposite sides of the shaft, means connecting said arms together in a manner that the tracer means and cutting tool move in unison, and means for connecting said vertical shafts so that the rotation of the tracer means shaft will effect a corresponding rotation of the cutting tool shaft.

4. In cutting apparatus of the character described, a base, a pair of spaced horizontal arms pivotally mounted upon said base, a second pair of arms hinged respectively to the outer ends of said first pair of arms, a vertical shaft rotatably carried at the outer end of one of said second-named arms, a cutting tool carried by said shaft, a second vertical shaft rotatably carried at the outer end of the other of said second-mentioned arms, tracer means carried by said second shaft and including a pair of guide rollers horizontally spaced equidistant from the axis of rotation of said second shaft and in diametrical alignment with one another, a template member having a guide-groove therein within which said guide rollers are received, means connecting said arms together in a manner that the tracer means and cutting tool move in unison, and means for connecting said vertical shafts so that the rotation of the tracer means shaft will effect a corresponding rotation of the cutting tool shaft.

5. In cutting apparatus of the character described, a base, a pair of spaced horizontal arms pivotally mounted upon said base, a second pair of arms hinged respectively to the outer ends of said first pair of arms, a vertical shaft rotatably carried at the outer end of one of said second-named arms, a cutting tool carried by said shaft, a second vertical shaft rotatably carried at the outer end of the other of said second-mentioned arms, tracer means carried by said second shaft, a template member engageable by said tracer means, means connecting said arms together in a manner that the tracer means and cutting tool move in unison, a gear carried by each of said vertical shafts, a horizontal connecting shaft, and gears fixed to the opposite ends of said horizontal shaft and meshing with the gears on said vertical shafts so that rotary movement of the tracer means shaft will effect a corresponding rotation of the cutting tool shaft.

6. In cutting apparatus of the character described, a base, a pair of spaced horizontal arms pivotally mounted upon said base, a second pair of arms hinged respectively to the outer ends of said first pair of arms, a vertical shaft rotatably carried at the outer end of one of said second-named arms, a cutting tool carried by said shaft, a second vertical shaft rotatably carried at the outer end of the other of said second-mentioned arms, tracer means carried by said second shaft and including a plurality of guide rollers, a template member having a guide-groove therein within which said guide rollers are adapted to be received, means connecting said arms together in a manner that the tracer means and cutting tool move in unison, a gear carried by each of said vertical shafts, a horizontal connecting shaft, and gears fixed to the opposite ends of said horizontal shaft and meshing with the gears on said vertical shafts so that rotary movement of the tracer means shaft will effect a corresponding rotation of the cutting tool shaft.

7. In cutting apparatus of the character described, a base, a pair of spaced horizontal arms pivotally mounted upon said base, a second pair of arms hinged respectively to the outer ends of said first pair of arms, a cutting unit rotatably carried by one of said second-named arms and including a cutting tool, a template member, tracer means rotatably carried by the other of said second-mentioned arms and including a pair of guide rollers continuously engaging said template member at two horizontally spaced points, means for connecting said arms together in a manner that the tracer means and cutting unit move in unison, and means connecting said tracer means and cutting unit for transmitting rotary movement of the former to the latter.

8. In cutting apparatus of the character described, a base, a pair of spaced horizontal arms pivotally mounted upon said base, a second pair of arms hinged respectively to the outer ends of said first pair of arms, a vertical shaft rotatably carried at the outer end of one of said second-named arms, a cutting tool carried by said shaft, a second vertical shaft rotatably carried at the outer end of the other of said second-mentioned arms, tracer means carried by said second shaft and including a pair of guide rollers horizontally spaced equidistant from the axis of rotation of said second shaft and in diametrical alignment with one another, a template member continuously engageable by said guide rollers, means connecting said arms together in a manner that the tracer means and cutting tool move in unison, and means for connecting said vertical shafts so that the rotation of the tracer means shaft will effect a corresponding rotation of the cutting tool shaft.

DAVID H. GOODWILLIE.